(12) United States Patent
Perera et al.

(10) Patent No.: US 10,467,729 B1
(45) Date of Patent: Nov. 5, 2019

(54) NEURAL NETWORK-BASED IMAGE PROCESSING

(71) Applicant: Amazon Technologies, Inc., Seattle, WA (US)

(72) Inventors: Pramuditha Hemanga Perera, Piscataway, NJ (US); Gurumurthy Swaminathan, Redmond, WA (US); Vineet Khare, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 25 days.

(21) Appl. No.: 15/782,390

(22) Filed: Oct. 12, 2017

(51) Int. Cl.
*G06K 9/32* (2006.01)
*G06T 3/40* (2006.01)

(52) U.S. Cl.
CPC .......... *G06T 3/4053* (2013.01); *G06T 3/4046* (2013.01); *G06T 2207/20081* (2013.01); *G06T 2207/20084* (2013.01); *G06T 2207/20132* (2013.01)

(58) Field of Classification Search
CPC ..... G06T 3/0012; G06T 1/0078; G06T 5/001; G06T 11/60; G06T 7/73; G06F 3/0484; G06F 3/04842; H04N 1/387; H04N 1/3872; H04N 1/3875; G06K 9/3233; G06N 3/088
See application file for complete search history.

(56) References Cited

U.S. PATENT DOCUMENTS

| | | | | |
|---|---|---|---|---|
| 2014/0098999 | A1* | 4/2014 | U S ........................ | H04N 5/14 382/107 |
| 2014/0294300 | A1* | 10/2014 | Swaminathan .... | G06K 9/00288 382/170 |
| 2017/0083762 | A1* | 3/2017 | Segalovitz ......... | G06K 9/00442 |

\* cited by examiner

*Primary Examiner* — Duy M Dang
(74) *Attorney, Agent, or Firm* — Lowenstein Sandler LLP

(57) ABSTRACT

A method and system for a deep learning-based approach to image processing to increase a level of optical zooming and increasing the resolution associated with a captured image. The system includes an image capture device to generate a display of a field of view (e.g., of a scene within a viewable range of a lens of the image capture device). An indication of a desired zoom level (e.g., 1.1× to 5×) is received, and, based on this selection, a portion of the field of view is cropped. In one embodiment, the cropped portion displayed by the image capture device for a user's inspection, prior to the capturing of a low resolution image. The low resolution image is provided to an artificial neural network trained to apply a resolution up-scaling model to transform the low resolution image to a high resolution image of the cropped portion.

20 Claims, 6 Drawing Sheets

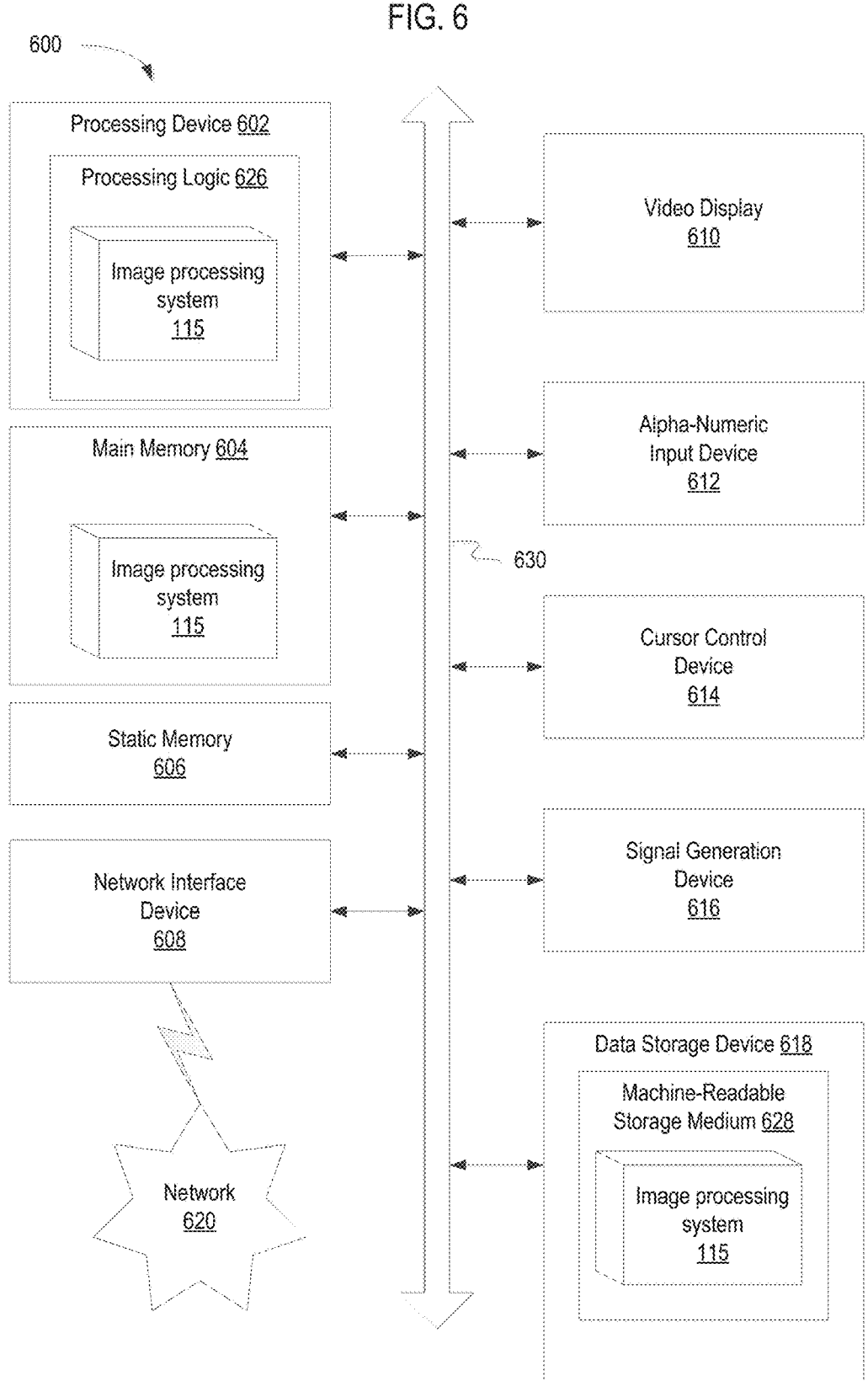

NEURAL NETWORK-BASED IMAGE PROCESSING

BACKGROUND

In digital photography, traditional optical zooming is achieved by physically manipulating a position of a camera lens. In this regard, the level or range of the optical zoom is limited by the size or power of the lens. In certain instances, a camera lens may be replaced with a more powerful lens when a higher level of zooming is desired. Accordingly, the amount or level of optical zoom for a particular camera is limited by the range of the one or more camera lenses.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

FIG. 6 is a schematic block diagram that provides an example illustration of a computing environment executing instructions relating to image processing, according to one embodiment.

Figure 1:
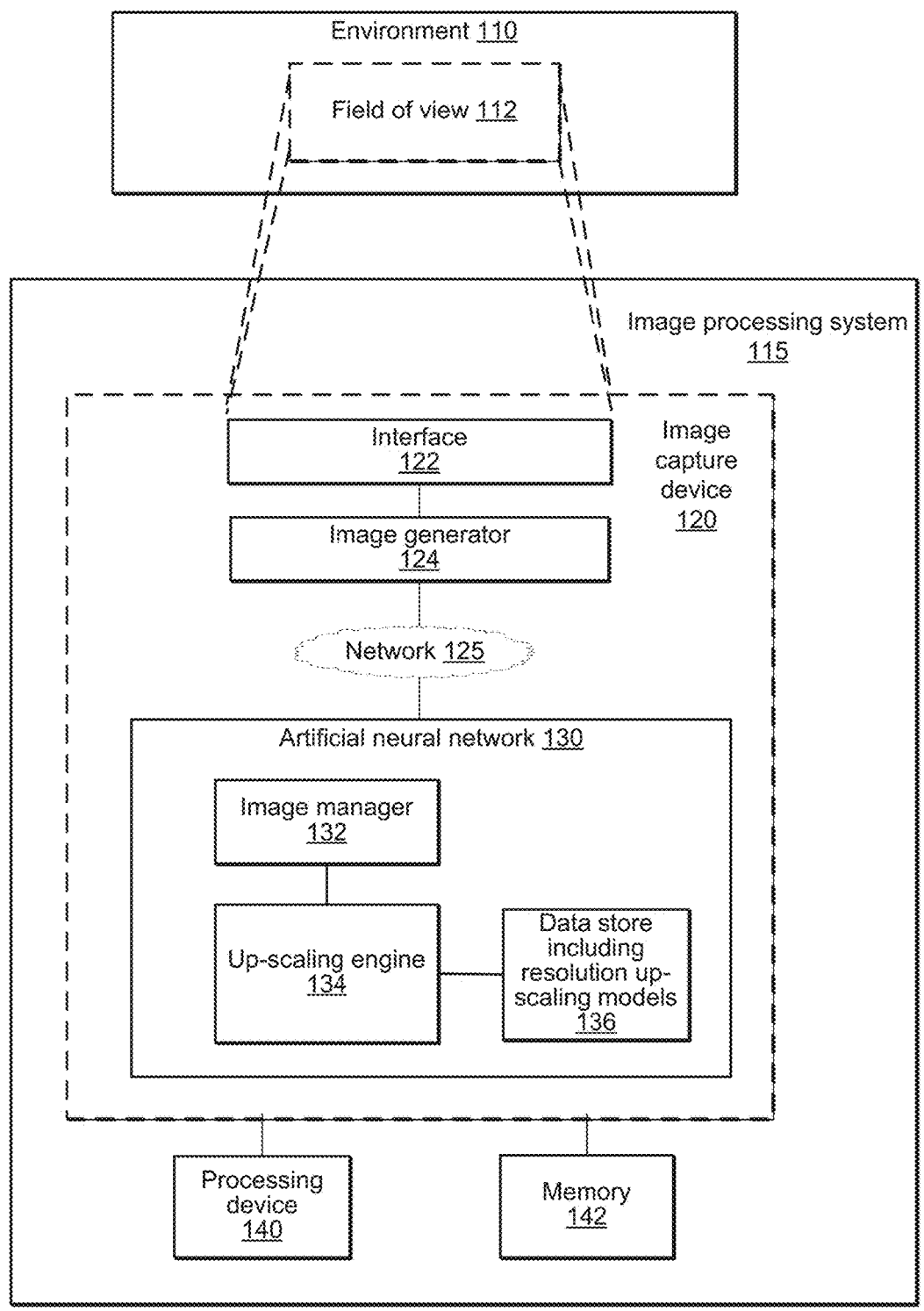
FIG. 1 illustrates an example image processing system, according to one embodiment.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments described herein relate to a deep learning-based approach to image processing to increase a level of optical zooming and increase the resolution associated with a captured image. In one embodiment, a system includes an image capture device configured to generate a display of a field of view of the image capture device (e.g., of a scene within a viewable range of a lens of the image capture device). In one embodiment, the image capture device (e.g., a camera) directed to a scene within the field of view receives an indication of a desired zoom level (e.g., 1.1× to 5×). In one embodiment, based on this selection, a region or portion of the field of view (e.g., area or scene viewable via a viewfinder of the image capture device or via a display of the image capture device) is cropped.

In one embodiment, the cropped portion is displayed by the image capture device. In one embodiment, the cropped portion is up-scaled (i.e., a resolution of the cropped portion is increased) using a transformation technique (e.g., bi-cubic transformation) prior to display via the image capture device. In one embodiment, the view of the cropped portion is displayed for a user's inspection, prior to the capturing of an image. In one embodiment, the up-scaled view of the cropped portion is displayed to the user as a "preview" of a zoomed version of an image to be captured by the image capture device. In one embodiment, the zoomed-in version of the field of view corresponding to the selected zoom level displayed by the image capture device is a low resolution image. For example, the version displayed prior to the capturing of an image may be cropped to represent the selected zoom level (e.g., 3×, 4×, 5×, etc.), but at a relatively low resolution. During subsequent processing by the neural network, the low resolution image of the cropped portion is transformed into a relatively high resolution image.

In one embodiment, in response to an image capture action (e.g., pressing a shutter button of the image capture device to shoot an image), a first resolution image of the cropped portion version of the captured image is captured and passed through a deep learning neural network to generate a second resolution image (e.g., a higher relative resolution than the first resolution) corresponding to the desired zoom level.

In one embodiment, image resolution is represented by a pixel count in the image (e.g., pixels per inch (ppi) or dots per inch (dpi), resolution units (e.g., lines per mm, lines per inch, etc.), an overall size of an image (e.g., lines per image height), angular subtense, etc. In one embodiment, a low resolution image is an image having a resolution of 320×240 pixels, 300×300 pixels, or lower. In one embodiment, a high resolution image is an image having a resolution of 1920× 1200 pixels, 3840×2160 pixels, or higher. In one embodiment, an image is identified as low resolution if it is less than 300 dpi (600 pixels×600 pixels) and high resolution if it is greater than or equal to 300 dpi.

In one embodiment, the first resolution image resulting from an initial up-scaling of the cropped portion of the field of view is a lower resolution than the second resolution produced by a neural network, as described in greater detail below. In one embodiment, the first resolution image may be a low resolution image and the second resolution image may be a high resolution image. As used herein, in this embodiment, the terms "low resolution" and "high resolution" are relative terms referring to a level of detail of an image or a view of an image based on a comparison with one another (e.g., comparing the first image produced by an initial up-scaling and the second image produced by a subsequent up-scaling performed by the neural network) or a threshold value (e.g., an image is identified as low resolution if it is less than 300 dpi and high resolution if it is greater than 300 dpi).

In one embodiment, the first resolution image may be high resolution image, but have a low image quality. In one embodiment, the image quality associated with an image may be represented by one or more visual parameters that affect a visual perception of the image by a viewer. In one embodiment, the one or more visual parameters may include a peak-signal-to-noise ratio (PSNR) parameter and/or a structural similarity index measure (SSIM) parameter. In one embodiment, the first resolution image may have a lower image quality (e.g., lower values associated with the one or more visual parameters).

In one embodiment, the first resolution image is provided to an operatively coupled artificial neural network adapted to implement one or more deep learning models configured to process images and perform transformations to increase image resolution. In one embodiment, the one or more instructions, programs, and deep learning models (also referred to as "resolution up-scaling models") may be stored locally on the image capture device (e.g., "on-board" the image capture device). In one embodiment, the neural network is stored remotely by another system communicatively connected to the image capture device via a suitable network. In one embodiment, a collection of resolution up-scaling models may be stored on the image capture device and employed to generate a higher resolution version of the zoomed portion of the field of view, in accordance with the selected zoom level. In one embodiment, the collection of resolution up-scaling models is scalable in the image capture device (e.g., the image capture device is configured to receive updates, changes, and revisions to existing models. Additionally, the image capture device may receive additional object detection models from another system (e.g., a service) for storage on the image capture device. In one embodiment, the artificial neural network may include deep learning models to improve the image quality of the first resolution image and to generate the second resolution image. For example, the first resolution image and the second resolution image may have the same or approximately the same resolution level, with the first image having a low image quality as represented by image quality parameters (e.g., PSNR, SSIM, etc.). In this example, the artificial neural network applies one or more models to improve or increase an image quality parameter value of the first image to generate a high resolution, high quality second image.

FIG. 1 is a block diagram illustrating various components of an image processing system 115, according to one embodiment. In one embodiment, the image processing system 115 may be an image capture device 120 including an artificial neural network 140 configured to capture and process images corresponding to an environment 110. In one embodiment, the object detection system 120 may include an image capture device including an interface 122, image generator 125, and the artificial neural network 130. In one embodiment, the artificial neural network 130 may include an image manager 132, an up-scaling engine 134, and a data store including one or more resolution up-scaling models 136. In one embodiment, the artificial neural network is a generative adversarial network (GAN) that has been trained to perform super resolution on input images. In one embodiment, as shown by the dashed line, a network 125 may be employed to operatively couple components of the image capture device 120 (e.g., a camera) and a remotely located artificial neural network 130. In one embodiment, the network 130 may be any suitable network, including, for example, the Internet, intranets, extranets, wide area networks (WANs), local area networks (LANs), wired networks, wireless networks, or other suitable networks, etc., or any combination of two or more such networks. In one embodiment, the image processing system 115 may further include a processing device 138 and a memory 136 configured to execute and store instructions associated with the functionality of the various components, programs, services, and modules of the image processing system 115, as described in greater detail below in connection with FIGS. 2-6.

In one embodiment, the interface 122 of the image capture device 120 displays a digital representation or "view" of a field of view 112 of an image capture device, where the field of view 112 includes a portion of the environment 110. In one embodiment, the field of view 112 represents a region or area that is within a viewable range of the image capture device 120. For example, the field of view 112 may cover a portion of the environment 110 that a user can visually perceive by gazing through a view finder of the image capture device 120 or via a digital interface of the image capture device 120. In one embodiment, the interface 122 may include one or more controls corresponding to functionality of the image capture device 120. In one embodiment, the controls may include an image capture action sensor (e.g., a "button" or other user-operable sensor) to receive and process an instruction or action to capture or "shoot" an image. In one embodiment, the image capture action sensor is a shutter button.

In one embodiment, the controls of the interface 122 may include a zoom level selector to receive a selection of a desired zoom level corresponding to the field of view 112. For example, the zoom level selector may be a physical or digital user-interface (e.g., a button, a slider, a menu, etc.) that enables the selection of a zoom level (e.g., 2×, 3×, 4×, 5×, etc.) In one embodiment, the zoom level may be set to any value within a zoom level range (e.g., 1.1× to 5.0×), including any positive non-integer numbers (e.g., 1.8×, 3.7×, 4.3×, etc.) or positive integer numbers (e.g., 2×, 3×, 4×, and 5×).

In one embodiment, the image generator 124 crops a portion of the field of view 112 in accordance with the selected zoom level. For example, if the user selects a 4× zoom level, the image generator 124 crops a portion of the field of view 112 corresponding to a 4× magnification of the field of view 112. In one embodiment, digital representation of the cropped portion is displayed via the interface 122 at a first resolution. In one embodiment, the first resolution may be established according to the characteristics, constraints, and parameters of the corresponding display (e.g., the camera's user display or viewfinder display). In one embodiment, the image generator 124 may up-scale the cropped portion (e.g., the first portion) from an initial resolution to the first resolution.

In one embodiment, a digital representation of the cropped portion corresponding to the selected zoom level is displayed via the interface 122 for user inspection. In one embodiment, a user may visually inspect the digital representation of the cropped portion prior to execution of an image capture action.

In one embodiment, in response to an image capture action (e.g., clicking the shutter button of the interface 122), the image generator 124 captures a digital representation of an image including the cropped portion of the field of view at the first resolution (e.g., a low resolution image). In one embodiment, the captured image (also referred to as the "first image" or "initial image") includes a digital representation of the cropped portion of the field of view 112 corresponding to the selected zoom level, but at a low resolution. In one embodiment, the first image may be captured while the image capture device 120 is in a selected mode. For example, the image capture device 120 may be in a shooting mode or preset mode relating to characteristics, types, styles, parameters, attributes, or properties relating to image capture, such as, a sports or action mode, a portrait mode, a panoramic mode, a shutter priority mode, etc. In one embodiment, the first image is provided to the neural network 130 for further processing. Advantageously, providing the digital representation of the cropped portion (as compared to the entire portion) of the field of view reduces an amount of processing that is performed by the neural network 130. In one embodiment, any suitable type of neural network may be employed, such as a lightweight neural network, a convolutional neural network (CNN), a region-based convolutional neural network (R-CNN), a GAN, or other neural network configured to up-scale an image from a lower resolution to a higher resolution.

In one embodiment, the image manager 132 receives the first image and data indicating the selected zoom level. In one embodiment, if the first image was captured with the image capture device 120 in a particular picture or shooting mode, data indicating the corresponding picture mode may be received by the image manager 132. In one embodiment, if the neural network 130 is remotely located and coupled to the image capture device 120 via the network 125, the image manager 132 may include a suitable network interface to enable the network-based communication with the image capture device 120.

In one embodiment, the image manager 132 may provide the digital representation of the first image (e.g., the low resolution image of the cropped portion) to the up-scaling engine 134. In one embodiment, the up-scaling engine 134 is coupled to a data store including one or more resolution up-scaling models. In one embodiment, during a training phase, the neural network 130 may employ a suitable deep learning technique to develop the one or more resolution up-scaling models based on a training dataset. The training dataset may include low resolution images and associated high resolution images. In one embodiment, mode-specific up-scaling models may be produced and employed by the up-scaling engine 134. In this embodiment, a particular up-scaling model may be associated with a particular picture or shooting mode, wherein the model customizes parameters of the resolution up-scaling in view of the corresponding shooting mode. For example, a first up-scaling model may be developed to up-scale an image taken in a sports shooting mode, a second up-scaling model may be developed to up-scale an image taken in a portrait shooting mode, and so on.

In one embodiment, the resolution up-scaling models may be based on a suitable super-resolution method, such as, for example, a Very Deep Super-Resolution (VDSR) model, a Laplacian Pyramid Super-Resolution Network (LapSRN) model, a Super-Resolution Generative Adversarial Network (SRGAN) model, etc. For example, the resolution up-scaling model may be a VDSR model configured to perform super-resolution on any value of a scale range, such as any scaling factor on a range from 1.1× to 5× (e.g., in increments of 0.1×).

In one embodiment, the up-scaling engine 134 may apply the one or more resolution up-scaling models to up-scale the first image to generate a second image having a second resolution (e.g., a relatively higher resolution as compared to the first resolution of the first image). In one embodiment, the up-scaling engine 134 may compare the second image to the selected zoom level data to confirm that the second image is a high resolution version corresponding to an appropriate portion of the field of view 112 in view of the zoom level selected by the user. In one embodiment, the second image (e.g., the high resolution image) may be stored by the image processing system 115, provided to the image capture device 120 (e.g., for display to a user via the interface 122), stored by a separate data store operatively coupled to the neural network 130, or a combination thereof.

In one embodiment, one or more users (e.g., the user shooting the image) may be provided with a model feedback interface that enables the setting of a model feedback mode. In one embodiment, in the model feedback mode, image pairs including corresponding low resolution image portions (e.g., the first image generated by the image capture device 120) and high resolution image portions (e.g., the second image) are captured. In one embodiment, the image pairs are provided to a service (e.g., a cloud-based service) configured to make adjustments (e.g., fine-tune) to the up-scaling models. Advantageously, the feedback process allows for the zooming and up-scaling models and methods to be adaptive to a type of camera lens, a type of image, a type of camera (e.g., a manufacturer, a camera model, etc.), and the like.

Figure 2:
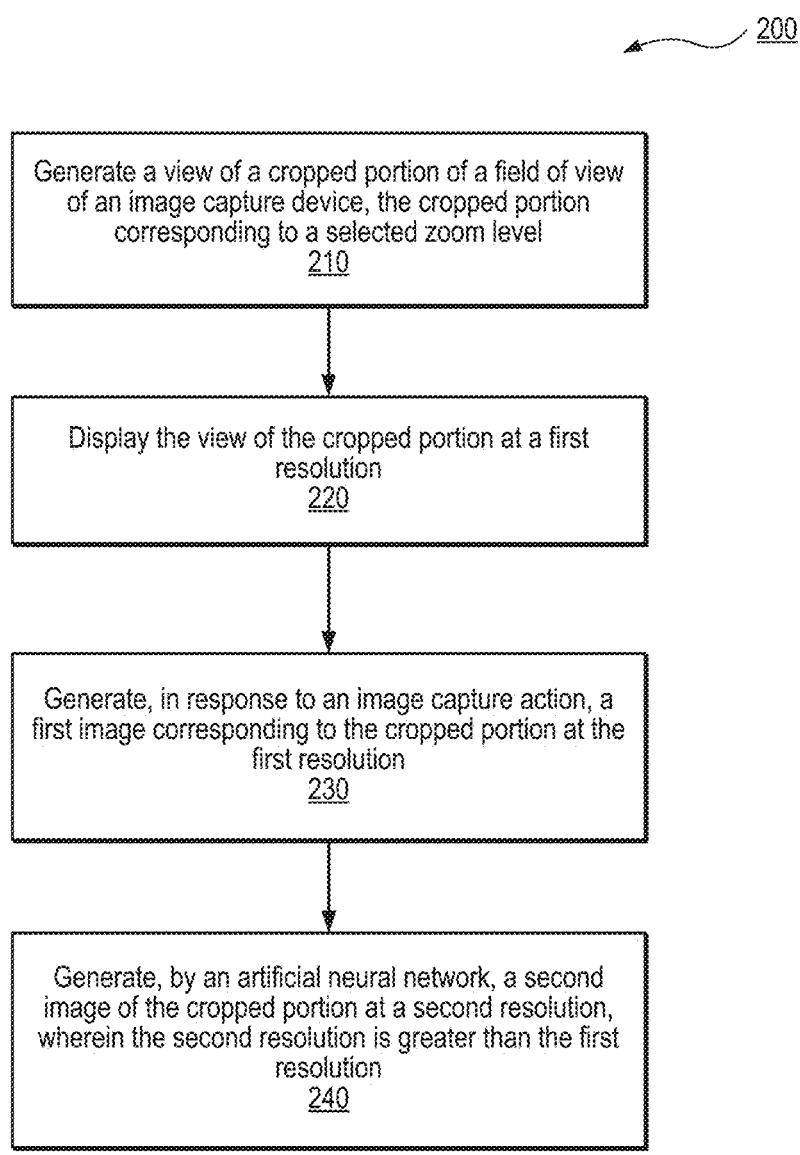
FIG. 2 is a flow diagram illustrating one embodiment of an image processing method, according to one embodiment.

FIG. 2 illustrates a flowchart that provides an example of a process 200 executed by an image processing system (e.g., image processing system 115 of FIG. 1), according to various embodiments. It is understood that the flowchart of FIG. 2 provides an example of the many different types of functional arrangements that may be employed to implement the operation of the image processing system as described herein. Process 200 may be performed by a processing logic that may comprise hardware (e.g., circuitry, dedicated logic, programmable logic, microcode, etc.), software (e.g., instructions run on a processing device), or a combination thereof. In one embodiment, the image processing system executes the method 200 to generate a high resolution image of a zoomed portion of a field of view of an image capture device.

In block 210, a view of a cropped portion of a field of view of an image capture device is generated. In one embodiment, the cropped portion corresponds to a selected zoom level. For example, the zoom level may be selected by a user of the image capture device from a zoom level range of values (e.g., a range of values between 1.1× and 5.0×).

In block 220, the view of the cropped portion is displayed at a first resolution. In one embodiment, the view may be displayed via an interface of the image capture device, such as a display screen or a viewfinder screen. In one embodiment, the view is presented (e.g., rendered) for inspection by a user, prior to the execution of an image capture command.

In block 230, in response to an image capture action (e.g., the pressing of a shutter button of the image capture device), a first image corresponding to the cropped portion of the field of view is generated. In one embodiment, the first image is generated at a first resolution (e.g., a relatively low resolution). For example, the first image may depict the zoomed-in or cropped portion of the field of view (e.g., a portion that the user wishes to zoom in on as indicated by the selected zoom level), but at a relatively lower resolution.

In block 240, an artificial neural network receives the first image (e.g., a digital representation of the first image) and generates a second image (e.g., a digital representation) of the cropped portion at a second resolution, wherein the second resolution is greater than the first resolution. In one embodiment, in block 240, the neural network applies one or more resolution up-scaling models to increase the resolution of the first image to a higher resolution value. In one embodiment, the neural network receives the digital representation of the first image of the cropped portion corresponding to the selected zoom level (e.g., 4.8×), up-scaling the resolution using one or more deep learning models, and generates a digital representation of a second image of the same cropped portion (e.g., 4.8× zoom level) at a second resolution (e.g., a resolution higher than the first resolution).

In one embodiment, the artificial neural network receives a low quality first image having a first resolution. In one embodiment, the first image may have a low image quality as represented by one or more image quality parameters. In one embodiment, the artificial neural network applies one or more models to increase or improve the image quality parameters. In one embodiment, the first image is a high resolution image with one or more low image quality parameter values.

In one embodiment, the artificial neural network may employ models configured to determine a PSNR image quality parameter represented by the following expression:

$$PSNR(f, g) = 10\log_{10}(255^2 / MSE(f, g)) \text{ where}$$

$$MSE(f, g) = \frac{1}{MN}\sum_{i=1}^{M}\sum_{j=1}^{N}(f_{ij} - g_{ij})^2$$

where MSE is the mean squared error between two images. In one embodiment, the artificial neural network generates a second image having a high resolution and an increased PSNR value, thereby improving the image quality of the second image as compared to the first image.

In one embodiment, the artificial neural network applies one or more models, where a low quality first image (e.g., an image having a low SSIM value) is input into the one or more models to generate a second high quality image (e.g., a second image having a higher SSIM value). In one embodiment, the SSIM quality parameter is represented by the following expression:

$$SSIM(f, g) = l(f, g)c(f, g)s(f, g) \text{ where}$$

$$\begin{cases} l(f, g) = \dfrac{2\mu_f\mu_g + C_1}{\mu_f^2 + \mu_g^2 + C_1} \\ c(f, g) = \dfrac{2\sigma_f\sigma_g + C_2}{\sigma_f^2 + \sigma_g^2 + C_2} \\ s(f, g) = \dfrac{\sigma_{fg} + C_3}{\sigma_f\sigma_g + C_3} \end{cases}$$

In one embodiment, the first term (l) is a luminance comparison function which measures a closeness of the two images' mean luminance ($\mu f$ and $\mu g$). This factor is maximized and equal to 1 if $\mu f = \mu g$. In one embodiment, the second term (c) is a contrast comparison function which measures the closeness of the contrast of the two images. In one embodiment, the contrast is measured by the standard deviation $\sigma f$ and $\sigma g$. In one embodiment, the contrast is maximized and equal to 1 if $\sigma f = \sigma g$. In one embodiment, the third term (s) is a structure comparison function which measures the correlation coefficient between the two images f and g, wherein $\sigma fg$ is the covariance between f and g. In one embodiment, the positive values of the SSIM index are in a [0,1] range, wherein a value of 0 means no correlation between the two images, and 1 means that image f equals image g. In one embodiment, the positive constants C1, C2 and C3 are used to avoid a null denominator. In one embodiment, the artificial neural network executes one or more models to improve the SSIM quality parameter of the first image to generate the second image (e.g., a high resolution, high quality image).

Figure 3:
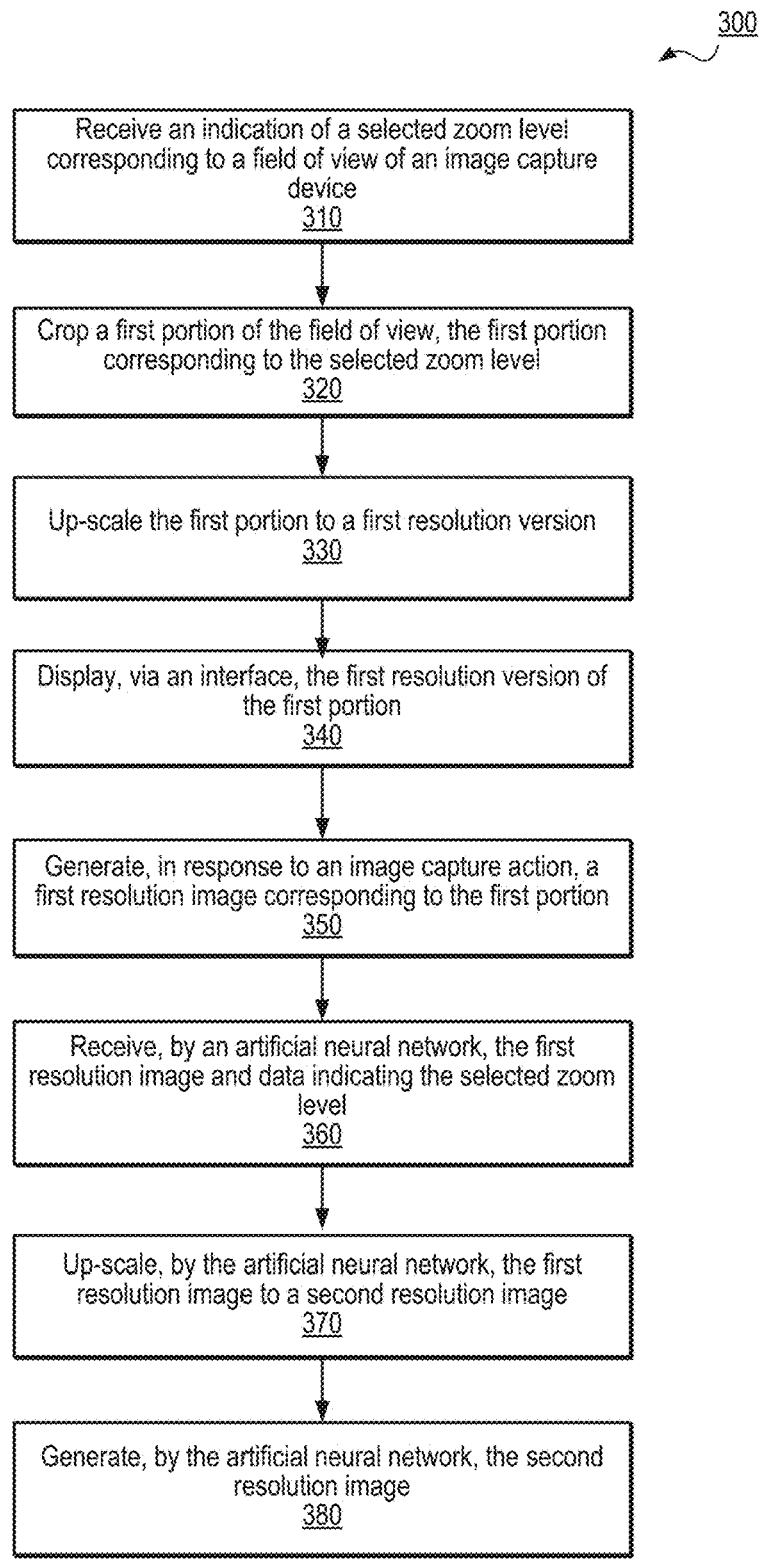
FIG. 3 is a flow diagram illustrating one embodiment of an image processing method, according to one embodiment.

FIG. 3 illustrates a flowchart that provides an example of a process 300 executed by an image processing system (e.g., image processing system 115 of FIG. 1), according to various embodiments. It is understood that the flowchart of FIG. 3 provides an example of the many different types of functional arrangements that may be employed to implement the operation of the image processing system as described herein. Process 300 may be performed by a processing logic that may comprise hardware (e.g., circuitry, dedicated logic, programmable logic, microcode, etc.), software (e.g., instructions run on a processing device), or a combination thereof. In one embodiment, the image processing system executes the method 300 to generate a high resolution version of a cropped portion of a field of view of an image capture device.

Figure 4:
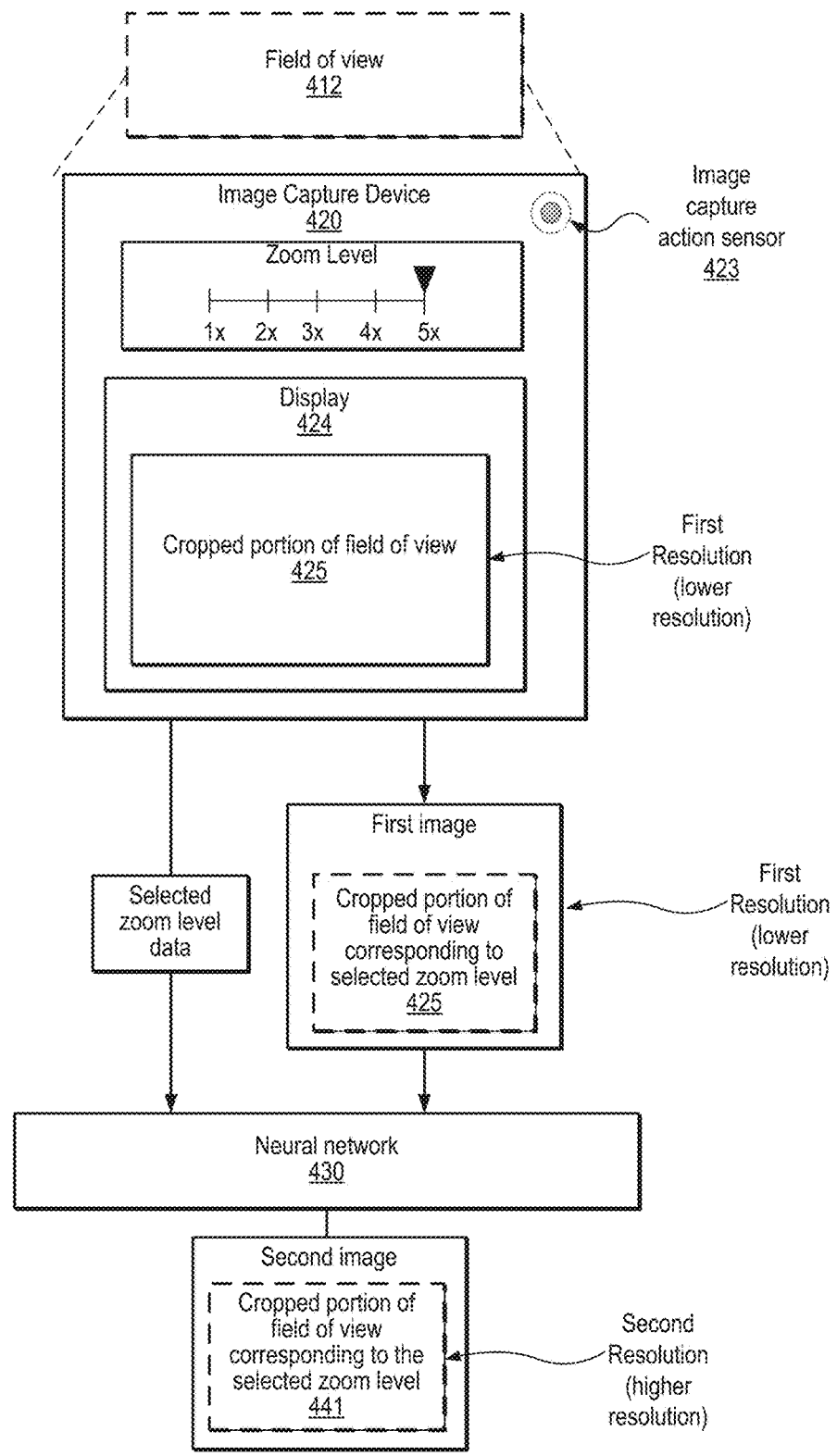
FIG. 4 depicts an example image processing system including image up-scaling, according to one embodiment.
Figure 5:
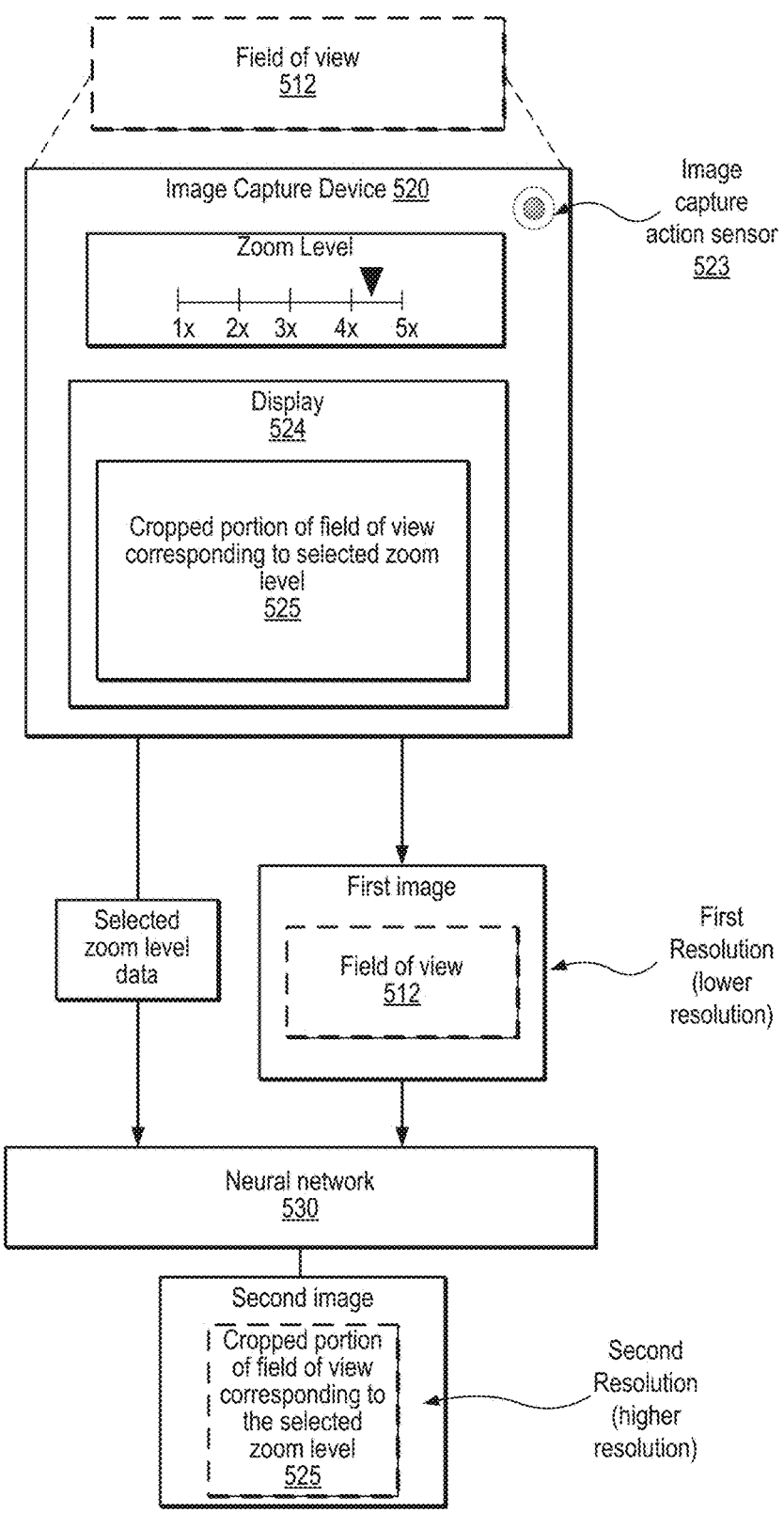
FIG. 5 depicts an example image processing system including image up-scaling, according to one embodiment.

In block 310, an indication of a selected zoom level corresponding to a field of view of an image capture device is received. In one embodiment, the indication may be a request, command, instruction, or other signal received from a user via one or more zoom level selection controls. For example, the image capture device may include an interface presenting a slider bar depicting a range of zoom levels that are selectable by a user (e.g., as shown in FIGS. 4 and 5. Advantageously, any value within the zoom level range may be selected, including positive non-integer values in the zoom level range, such as 2.7×, 3.9×, 4.6×, etc.

In block 320, a first portion of the field of view corresponding to the selected zoom level is cropped. In one embodiment, an appropriate or corresponding portion of the field of view is cropped from a center of the field of view, in accordance with the selected zoom level.

In block 330, the first portion (e.g., the cropped portion) is up-scaled to a first resolution version. In one embodiment, the cropped portion is up-scaled by the image capture device using a bicubic transformation or interpolation.

In block 340, the cropped portion is displayed via the image capture device, prior to the capturing of a digital representation of a corresponding image. In one embodiment, the cropped portion is displayed at the first resolution (or a resolution determined in accordance with the parameters of the display of the image capture device). In one embodiment, if up-scaling is performed in block 330, the cropped portion may be displayed at the up-scaled first resolution. In one embodiment, the cropped portion is presented to a user for visual inspection, prior to the execution of an image capture action.

In block 350, a digital representation of a first image of the cropped portion of the field of view is generated, in response to an image capture action. In one embodiment, the first image is generated at the first resolution (e.g., with or without the up-scaling as described in block 330). In one embodiment, the first resolution is a relatively low resolution. For example, the first resolution may appear blurry, grainy, or distorted when visually perceived by a human.

In block 360, the first resolution image corresponding to the cropped portion is received as an input by a neural network including one or deep learning resolution transformation models.

In block 370, the neural network applies a deep learning model to up-scale the first resolution image to a second resolution image. In one embodiment, the second resolution is a higher resolution than the first resolution. For example, the neural network may transform the image data from a first resolution of 72 dpi to a second resolution of 300 dpi. In one embodiment, the neural network applies one or more resolution up-scaling models to transform the low resolution first image to a high resolution second image. In one embodiment, the neural network may apply an up-scaling model in view of the selected zoom level data associated with the first image, the shooting mode associated with the first image, or a combination thereof.

In block 380, the neural network generates a digital representation of an image of the cropped portion having the second resolution. In one embodiment, the generated second resolution (e.g., high resolution) image of the cropped portion of the field of view may be stored in a memory, provided to a display (e.g., a display of the image capture device), or a combination thereof. In one example, the alarm may be generated using an alarm module (e.g., alarm module 136 of FIG. 1), such as a haptic Feedback unit, an audio generating component, or other component configured to generate an alarm.

FIG. 4 depicts an example image processing system and method, according to one embodiment. As shown in FIG. 4, an image capture device 420 may be directed to a field of view 412. A user may wish to zoom in on a particular portion of the field of view, rather than capture an image of the whole field of view (e.g., the area viewable via a viewfinder or display of the image capture device).

As shown in FIG. 4, an image capture device 420 includes an interface enabling the selection of a desired zoom level. In the example shown, the zoom level may be selected from a zoom level range including values of 1.1× and 5.0×. In the illustrated example, a zoom level of 5× is selected. Upon the selection of the zoom level, a display 424 of the image capture device 420 displays a cropped portion of the field of view 425 (e.g., the portion corresponding to the selected zoom level). As shown in FIG. 4, the cropped portion of the field of view 425 may be displayed at a first resolution (e.g., a relatively low resolution).

Following an inspection of the cropped portion of the field of view 425 via the display, a user may interact with an image capture action sensor 423 (e.g., a shutter button) of the image capture device 420 initiate the capturing of a digital representation of a first image. As shown in FIG. 4, the first image includes the cropped portion of the field of view 425 at a low resolution (e.g., the first resolution). In one embodiment, the first image and the selected zoom level data are provided as inputs to a neural network 430.

In one embodiment, the neural network 430 applies one or more deep learning models (e.g., VDSR models, LapSRN models, SRGAN models, etc.) to generate a second image of the cropped portion of the field of view corresponding to the selected zoom level 441 at a second resolution, wherein the second resolution is greater than the first resolution. In one embodiment, the models employed by the neural network 430 are trained to transform a low resolution image (e.g., the first image) to a high resolution image (e.g., the second image). In one embodiment, the neural network 430 may compare the cropped portion of the second image to the selected zoom level data to confirm the high resolution version of the cropped portion corresponds to the selected zoom level.

In one embodiment, a user feedback mode may be selected wherein as the user changes the selected zoom levels of the image capture device using optical zoom controls, high resolution images and low resolution images are captured and paired. In one embodiment, the image pairs (e.g., a low resolution first image generated by the image capture device and a high resolution second image generated by the neural network) are provided to a service (e.g., a cloud-based service) to analyze the resulting pairs for use in adaptively fine-tuning or adjusting the resolution up-scaling models applied by the neural network 430.

FIG. 5 depicts an example image processing system and method, according to one embodiment. As shown in FIG. 5, an image capture device 520 may be directed to a field of view 512. In one embodiment, a user (e.g., a camera operator) selects a zoom level from a selectable range. In the example shown in FIG. 5, the selectable range is for any value between 1.1× and 5×. As shown, a zoom level of 4.4× is selected and a cropped portion of the field of view corresponding to the selected zoom level is generated and shown on a display 524 of the image capture device 520.

In one embodiment, the cropped portion of the field of view corresponding to the selected zoom level (e.g., 4.4×) is displayed to the user for inspection, prior to the user's interaction with an image capture action sensor 523 (e.g., a shutter button of the image capture device 520). In one embodiment, the displayed image of the cropped portion may be up-scaled to a higher resolution to facilitate the user's inspection of the cropped portion 525.

In one embodiment, upon receipt of the image capture action via the image capture action sensor 523 (e.g., the pressing and releasing of a shutter button of the image capture device) a first image of at least a portion of the field of view 512 is captured. For example, the first image may be a 1.0× (e.g., the entire field of view) or 1.5× or 2× zoomed portion of the field of view. In one embodiment, the portion of the field of view (e.g., the entire field of view or a cropped portion) is not cropped or zoomed to the selected zoom level. In one embodiment, the first image of the field of view 512 is captured at a first resolution and is provided to the neural network 530 as an input along with the selected zoom level data.

In one embodiment, using the selected zoom level data, the neural network 530 crops a portion of the first image corresponding to the selected zoom level. In one embodiment, the neural network generates a second image of the cropped portion of the field of view 525 at a second resolution, wherein the second resolution is greater than the first resolution. In one embodiment, the neural network 530 applies a deep learning model to transform the first resolution of the first image to the second resolution of the second image. In one embodiment, the neural network 530 crops and transforms the low resolution first image to generate the high resolution second image of the cropped portion corresponding to the selected zoom level.

FIG. 6 illustrates a diagrammatic representation of a machine in the example form of a computer system 600 including a set of instructions executable by an image processing system 115 to cause the system to perform any one or more of the methodologies discussed herein. In one embodiment, the object detection system may include instructions to enable execution of the processes and corresponding components shown and described in connection with FIGS. 1-6.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. In various implementations of the present disclosure, the processing device 602 is configured to execute instructions for the image processing system 115 for performing the operations and processes described herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions of the image processing system 115 embodying any one or more of the methodologies or functions described herein. The instructions may also reside, completely or at least partially, within the main memory 604 and/or within processing logic 626 of the processing device 602 during execution thereof by the computer system 600, the main memory 604 and the processing device 602 also constituting computer-readable media.

The instructions may further be transmitted or received over a network 620 via the network interface device 608. While the computer-readable storage medium 628 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating", "displaying", "receiving", "cropping", "up-scaling", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving, by an image capture device, an indication of a selected zoom level corresponding to a field of view of the image capture device;
cropping a first cropped portion of the field of view, the first cropped portion corresponding to the selected zoom level;
up-scaling the first cropped portion to generate an up-scaled version of the first cropped portion;
displaying, via an interface of the image capture device, the up-scaled version of the first cropped portion;
generating, in response to an image capture action, a first image corresponding to the first cropped portion, wherein the first image is generated at a first resolution, wherein the first image comprises a first image quality;
receiving, by an artificial neural network, the first image at the first resolution;
up-scaling, by the artificial neural network, the first resolution to a second resolution, wherein the second resolution is greater than the first resolution; and
generating, by the artificial neural network, a second image comprising the first cropped portion, wherein the second image is generated at the second resolution, wherein the second image comprises a second image quality, and wherein the second image quality is greater than the first image quality.

2. The method of claim 1, further comprising:
applying, by the artificial neural network, one or more resolution up-scaling models to the first image.

3. The method of claim 1, wherein the second resolution is greater than or equal to 300 dots per inch (dpi).

4. The method of claim 1, wherein the image capture device is in a first preset shooting mode.

5. The method of claim 4, wherein the artificial neural network applies a resolution up-scaling model corresponding to the first preset shooting mode.

6. A device comprising:
a memory to store instructions associated with an artificial neural network;
a sensor to capture a first image corresponding to a field of view;
a processing device operatively coupled to the memory and the sensor, the processing device to:
generate a view of a cropped portion of the field of view, the cropped portion corresponding to a selected zoom level;
display the view of the cropped portion at a first resolution;
generate, in response to an image capture action, the first image corresponding to the cropped portion at the first resolution; and
generate, by the artificial neural network, a second image of the cropped portion at a second resolution, wherein the second resolution is greater than the first resolution.

7. The device of claim 6, the artificial neural network to apply a resolution up-scaling model to transform the first resolution to the second resolution.

8. The device of claim 6, wherein the view of the cropped portion is displayed via a display of the device prior to execution of the image capture action.

9. The device of claim 6, the processing device to receive an indication of the selected zoom level via an interface of the device.

10. The device of claim 6, wherein the selected zoom level is a positive non-integer value.

11. The device of claim 6, the processing device to:
operate in a feedback mode;
generate an image pair comprising the first image and the second image;
generate first data identifying at least one of a type of camera lens associated with the device or a shooting mode associated with the first image; and
provide the image pair and the first data to an operatively coupled service to cause an update to a resolution up-scaling model.

12. The device of claim 6, wherein the first image is captured in a first preset shooting mode.

13. The device of claim 12, wherein the artificial neural network applies a resolution up-scaling model corresponding to the first preset shooting mode.

14. The device of claim 6, the processing device to up-scale the view of the cropped portion to the first resolution prior to display.

15. The device of claim 6, wherein the artificial neural network is trained to comprise a plurality of resolution up-scaling models.

16. A non-transitory computer-readable storage device storing computer-executable instructions that, if executed by a processing device, cause the processing device to:
store data indicating a selected zoom level corresponding to a field of view of an image capture device;
cause a display of a cropped portion of the field of view, the cropped portion corresponding to the selected zoom level;
generate, in response to an image capture action, a first image corresponding to the field of view at a first image quality;
provide the data indicating the selected zoom level and the first image to an artificial neural network; and
generate, by the artificial neural network, a second image of the cropped portion corresponding to the selected zoom level at a second image quality, wherein the second image quality is greater than the first image quality.

17. The non-transitory computer-readable storage device of claim 16, the artificial neural network to crop the first image of the field of view in accordance with the data indicating the selected zoom level.

18. The non-transitory computer-readable storage device of claim 16, the artificial neural network to apply a model to the first image to generate the second image at the second image quality.

19. The non-transitory computer-readable storage device of claim 16, the processing device to receive the data indicating the selected zoom level via an interface of the device.

20. The non-transitory computer-readable storage device of claim 16, wherein the selected zoom level is a positive non-integer value.

* * * * *